United States Patent
Gallegos et al.

(10) Patent No.: US 12,323,090 B2
(45) Date of Patent: Jun. 3, 2025

(54) RAIL SPACING TOOL FOR PHOTOVOLTAIC MODULE(S)

(71) Applicant: Unirac, Inc., Albuquerque, NM (US)

(72) Inventors: Ernest Gallegos, Albuquerque, NM (US); Jeffrey Ballard, Albuquerque, NM (US); Tristen Foley, Rio Rancho, NM (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/199,814

(22) Filed: May 19, 2023

(65) Prior Publication Data

US 2024/0388240 A1  Nov. 21, 2024

(51) Int. Cl.
*H02S 20/30* (2014.01)
*H02S 30/10* (2014.01)

(52) U.S. Cl.
CPC .............. *H02S 20/30* (2014.12); *H02S 30/10* (2014.12)

(58) Field of Classification Search
CPC ....................................................... H02S 30/10
See application file for complete search history.

(56) References Cited

U.S. PATENT DOCUMENTS

2018/0090633 A1  3/2018  Cho et al.
2021/0194426 A1*  6/2021  Konaka ................... H02S 20/32
2022/0190778 A1  6/2022  Worden et al.
2022/0200521 A1  6/2022  Kauffman et al.
2023/0304520 A1*  9/2023  Poland ..................... H02S 30/10

FOREIGN PATENT DOCUMENTS

| CN | 218829802 | * | 4/2023 |
| CN | 218829802 U | | 4/2023 |

OTHER PUBLICATIONS

Invitation to Pay Additional Fees for International Application No. PCT/US24/22348, Dated May 29, 2024, 2 pages.
Search Report and Written Opinion for International Application No. PCT/US2024/022348, Dated Sep. 5, 2024, 10 pages.

* cited by examiner

*Primary Examiner* — Jayne L Mershon
(74) *Attorney, Agent, or Firm* — Lee & Hayes, P.C.

(57) ABSTRACT

A system include a bar, a first spacing tool, and a second spacing tool. The bar has a first end and a second end. The first spacing tool has a first base configured to receive a first rail, a first channel configured to receive a first portion of the bar proximate to the first end, and a first fastener configured to secure the first portion of the bar within the first channel. The second spacing tool has a second base configured to receive a second rail, a second channel configured to receive a second portion of the bar proximate to the second end, and a second fastener configured to secure the second portion of the bar within the second channel.

14 Claims, 13 Drawing Sheets

RAIL SPACING TOOL FOR PHOTOVOLTAIC MODULE(S)

BACKGROUND

The solar industry is growing world-wide and, as a result, more-efficient structures are desirable for mounting photovoltaic modules or solar panel modules to a structure, such as a roof of a home or other building. Whereas many different structures are known, there is a desire to reduce the complexity of such structures and improve the efficiency of such structures. Therefore, there is a need for an improved apparatus for mounting solar panel modules.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

DETAILED DESCRIPTION

Figure 1:
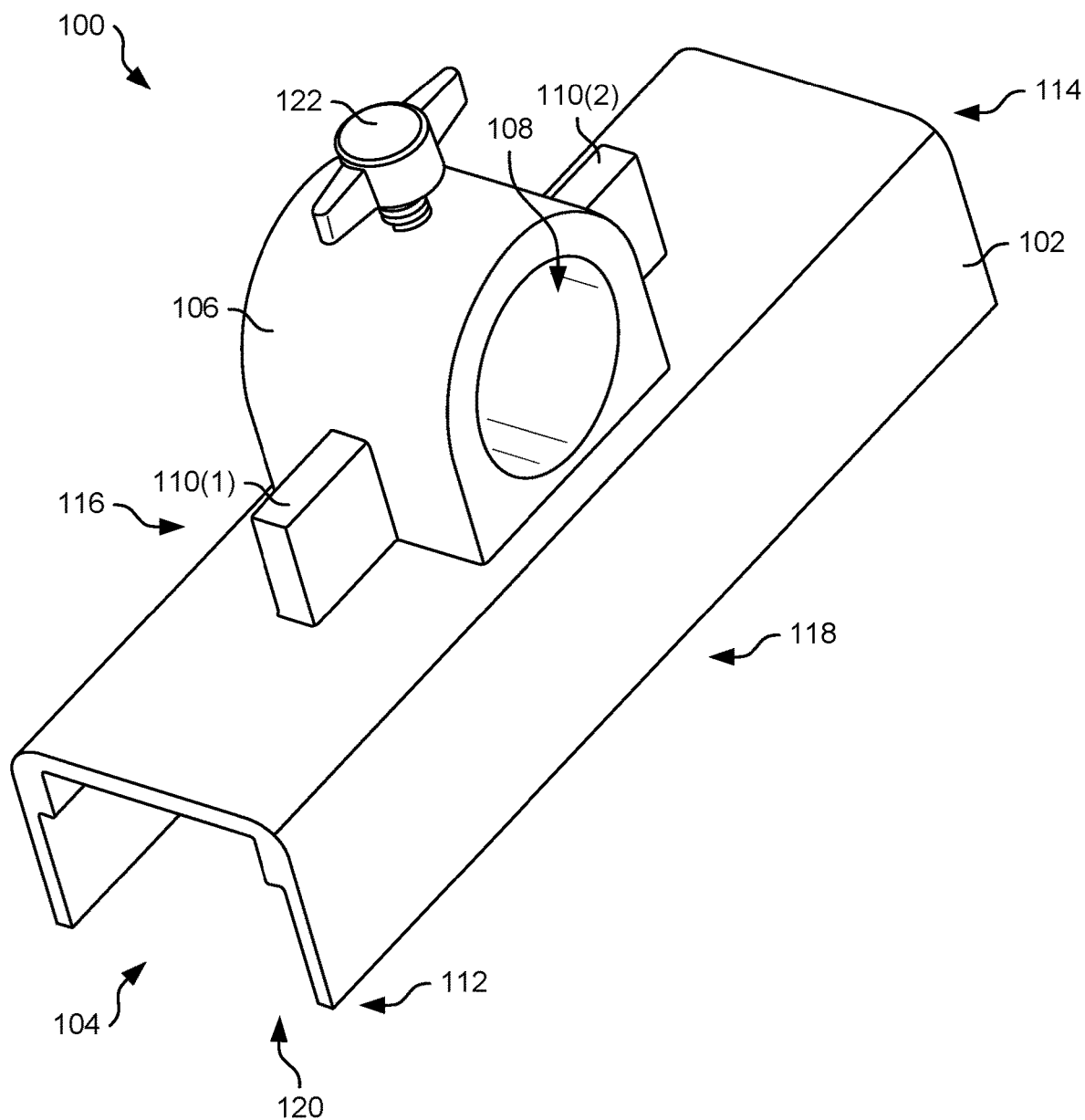
FIG. 1 illustrates a perspective view of an example spacing tool that may be used to space apart rails for receiving photovoltaic modules, according to an embodiment of the present disclosure.
Figure 1:
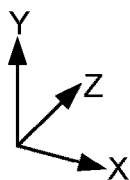

This application is directed, at least in part, to a spacing tool (e.g., device, apparatus, etc.) for spacing rails that are configured to secure photovoltaic modules to a structure. The rails, for example, may be secured to the structure, such as a roof, and the photovoltaic modules may therein couple to the rails. One or more of the spacing tools may be used to space the rails apart from one another such that the photovoltaic modules are securable to the rails. For example, in an embodiment, the photovoltaic module may be secured at a first side to a first rail, and at a second side, opposite the first side, to a second rail. The spacing tools may accurately space the first rail and the second rail apart from one another such that the photovoltaic module is securable to the rail. In an embodiment, the spacing tools are utilized to space the rails apart from one another, and after being spaced apart, the rails may be secured into the structure (e.g., via fasteners). The spacing tool may therefore ensure that the rails to which the photovoltaic module are coupled are accurately spaced apart from one another.

The rails may represent any suitable mounting equipment capable of receiving the photovoltaic modules and securing the photovoltaic modules to the surface. The rails may include a length along which the photovoltaic modules are coupled, and along the length, any number of photovoltaic modules may couple to the rails (e.g., four, five, ten, twenty, etc.). Additionally, any number of the rails may be disposed adjacent to one another for extending the photovoltaic modules laterally across the structure. The rails may also include any suitable shape (e.g., circular, square, etc.), cross-section (e.g., C-channel, I-frame, H-frame, etc.), etc. In an embodiment, brackets, mounts, etc. may be used to secure the rails to the structure. Additionally, the photovoltaic modules may be secured to the rails via brackets, mounts, fasteners, etc.

As introduced above, the photovoltaic modules may couple to the rails along one or more sides of the photovoltaic modules. The spacing tool is used to ensure that the rails are evenly spaced apart from one another, across the surface, to permit the photovoltaic modules to be coupled to the rails. For example, if the rails are not evenly spaced apart, the photovoltaic modules and/or the rails may be misaligned and the photovoltaic modules may not be capable of being coupled to the rails and/or the rails may fail to adequately support the photovoltaic modules. In an embodiment, the rails are arranged parallel to one another on the surface, and the spacing tool(s) are used to space the rails parallel to one another.

In an embodiment, the spacing tool may include a base that defines a receptacle which engages with the rail. The rail spacing tool may also include a collar that defines a channel in which a bar is received. The collar may couple to or extend from the base, on a side opposite in which the receptacle of the base is defined. The spacing tool may also include a fastener, coupler, etc. that secures the bar within the channel. For example, the collar may include a threaded opening in which the fastener is received and that is open to the channel for engaging with the bar. As the fastener is tightened, an end of the fastener may extend into the channel for engaging with the bar, and as the fastener is loosened, the end of the fastener may extend out of the channel for disengaging with the bar, thereby permitting the spacing tool to be repositioned along the bar.

In an embodiment, the bar may extend between two adjacent rails being installed on the structure. For example, the bar may include a length that extends between a first end and a second end. To evenly space the rails apart from one another, two spacing tools may be used. For example, a first spacing tool may be disposed proximate to the first end of the bar and a second spacing tool may be disposed proximate to the second end of the bar. In an embodiment, the first spacing tool and the second spacing tool may be the same (e.g., identical). The first spacing tool and the second spacing tool may each include the channel in which the bar is received. Depending upon the spacing between the rails, however, the first spacing tool and the second spacing tool may be coupled to the bar at different positions.

For example, photovoltaic modules may include different lengths, widths, etc., and the rails may be spaced apart by a given distance to support the photovoltaic modules. As such, depending upon the application and/or the specifics of the photovoltaic modules, the rails may be spaced apart by different amounts. Here, the first spacing tool may be disposed along the first rail, via the receptacle of the first spacing tool engaging with the first rail, and secured to the bar via the fastener. The fastener of the second spacing tool, meanwhile, may be loosened and the bar may be slid through the channel of the second spacing tool until the desired spacing between the first rail and the second rail is achieved. Thereafter, the fastener of the second spacing tool may be secured into the bar, thereby locking (e.g., clamping) the second spacing tool to the bar. With the proper spacing between the first rail and the second rail, the first rail and the second rail may be secured to the surface.

Additionally, the first spacing tool and the second spacing tool may be slid along the first rail and the second rail, via the receptacles, respectively, to space the first rail and the second rail apart from one another along their respective lengths. For example, after spacing the first rail and the second rail apart from one another at a first end of the rails, the first spacing tool and the second spacing tool may be slid along the first rail and the second rail, or picked up and moved, to a second location. Using the first spacing tool and the second spacing tool at the different locations may ensure that the first rail and the second rail are spaced evenly apart along their lengths.

The receptacle of the spacing tool may be complimentary to a shape of the rail to permit the receptacle to fit onto or otherwise receive the rails. In an embodiment the receptacle may rest on and/or engage with the rail. However, in an embodiment, the spacing tool may not include the receptacle, and instead, the base may include other ribs, projections, etc. for engaging with the rails and used to space the rails apart from one another by a desired distance.

In an embodiment, the spacing tool may include flanges that are used to space the adjacent photovoltaic modules apart from one another. The flanges may extend from the base, on either or both sides of the collar. For example, the first spacing tool and the second spacing tool may be used to space apart the first rail and the second rail that are used to support first photovoltaic modules along their length (e.g., along a length of the first rail and the second rail), and a third rail, for example, may extend adjacent to the first rail. Second photovoltaic modules, for example, may extend along a length of the first rail and the third rail. Similar to that discussed above, the first spacing tool and the second spacing tool may be used to space the third rail apart from the first rail, whether by the same or different amount. Additionally, the flanges of the first spacing tool and the second spacing tool may space the first photovoltaic modules and the second photovoltaic modules apart from one another. In doing so, between adjacent rails, the photovoltaic modules may be evenly spaced apart. In an embodiment the flanges may include a desired thickness corresponding to the desired spacing between the photovoltaic modules across the rails. For example, the flanges may be ¼", ½", ¾", etc. thick.

Although discussed herein as being used to space two rails apart, in an embodiment, an additional spacing tool may be used to space a third rail. For example, between the first end and the second end of the bar, a third spacing tool may engage with the bar. The third spacing tool may be used to space a third rail, between the first rail and the second rail, for example, to secure a middle portion of the photovoltaic modules to the third rail. However, any number of rails and/or any number spacing tools may be used to space the rails apart.

In an embodiment, the bar may include indications that indicate a desired spacing between the rails. For example, if the spacing between the rails is sixty (60) inches, the first spacing tool may be set at zero (0) at the first end of the bar and secured using the fastener, and the second spacing tool may be set at sixty inches at (or proximate to) the second end of the bar and secured using the fastener. Therein, the first spacing tool and the second spacing tool, connected via the bar, may be used to space the first rail and the second rail. Other indications, markers, indents, etc. may be used.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a spacing tool 100 that may be used for spacing rails that are used to secure photovoltaic modules to a structure, according to an embodiment of the present disclosure. The spacing tool 100 may include a base 102 that defines a receptacle 104, a collar 106 that defines a channel 108, and one or more flanges 110, such as a first flange 110(1) and a second flange 110(2) that extend from the base 102. The base 102, or more generally, the spacing tool 100, may extend between a first end 112 and a second end 114 (e.g., spaced apart in the Z-direction), and between a first side 116 and a second side 118 (e.g., spaced apart in the X-direction). Although shown and described as including the first flange 110(1) and the second flange 110(2), in an embodiment, the spacing tool 100 may only include one of the first flange 110(1) or the second flange 110(2).

The base 102 may receive a rail. For example, the receptacle 104 may be configured to reside on/over the rail that couples to the structure. The receptacle 104 serves to seat or otherwise engage the spacing tool 100 to the rail such that the rail may be manipulated and spaced apart from another rail. The receptacle 104 may extend between the first end 112 and the second end 114, such that the spacing tool 100 may be slid along the rail. The receptacle 104 may include a cross-sectional shape, size, etc. that corresponds to the rail that the spacing tool 100 is configured to engage. As shown, the receptacle 104 may be open at a bottom 120 to receive or otherwise engage the rail.

As will be explained herein, photovoltaic modules being installed on the surface may couple to the rail (i.e., for disposing the photovoltaic modules on the surface). However, prior to installing the photovoltaic modules, the rails may be evenly spaced apart from one another using one or more of the spacing tools 100. In an embodiment, more than one spacing tool 100 may be used for spacing the rails apart from one another, and a bar may extend between the spacing tools 100 for spacing the rails apart at a desired distance.

The channel 108 is configured to receive the bar that spaces the spacing tool 100 apart from another spacing tool 100. For example, an end of the bar may slide into the channel 108, and a fastener 122 (e.g., wing screw) may be tightened to clamp the bar within the channel 108. Although shown and described as a wing screw, for example, the fastener 122 may represent a spring-loaded clip, a friction pad, a key/keyway, coupler (e.g., knock over center clamp), etc. for clamping the spacing tool 100 and the bar together. In doing so, the bar may become secured to the spacing tool 100, or stated alternatively, the spacing tool 100 may be secured to the bar at a particular location on the bar. The same process may repeat for the other spacing tool 100 such that the spacing tools 100 are spaced apart from one another along the length of the bar that corresponds to the desired spacing between the rails.

The one or more flanges 110 may be used to space the photovoltaic modules apart from one another (e.g., in the X-direction) between adjacent rails. In an embodiment, a thickness of the one or more flanges 110 is ¼", ½", ¾", etc. (e.g., in the X-direction). The first flange 110(1) may be disposed closer to the first end 112, on a first side of the channel 108, while the second flange 110(2) may be disposed closer to the second end 114, on a second side of the channel 108.

Although the spacing tool 100 is described as including separate components, such as the base 102, the collar 106, and the one or more flanges 110, the spacing tool 100 may represent a unitary structure. In this sense, the base 102, the collar 106, and/or the one or more flanges 110 may be formed via different portions of a single body. Suitable manufacturing techniques for forming the spacing tool 100 include injection molding, extrusion, casting, etc. The spacing tool 100 may also be made from metal (e.g., aluminum), plastic, composites, and/or any combination thereof.

Figure 2:
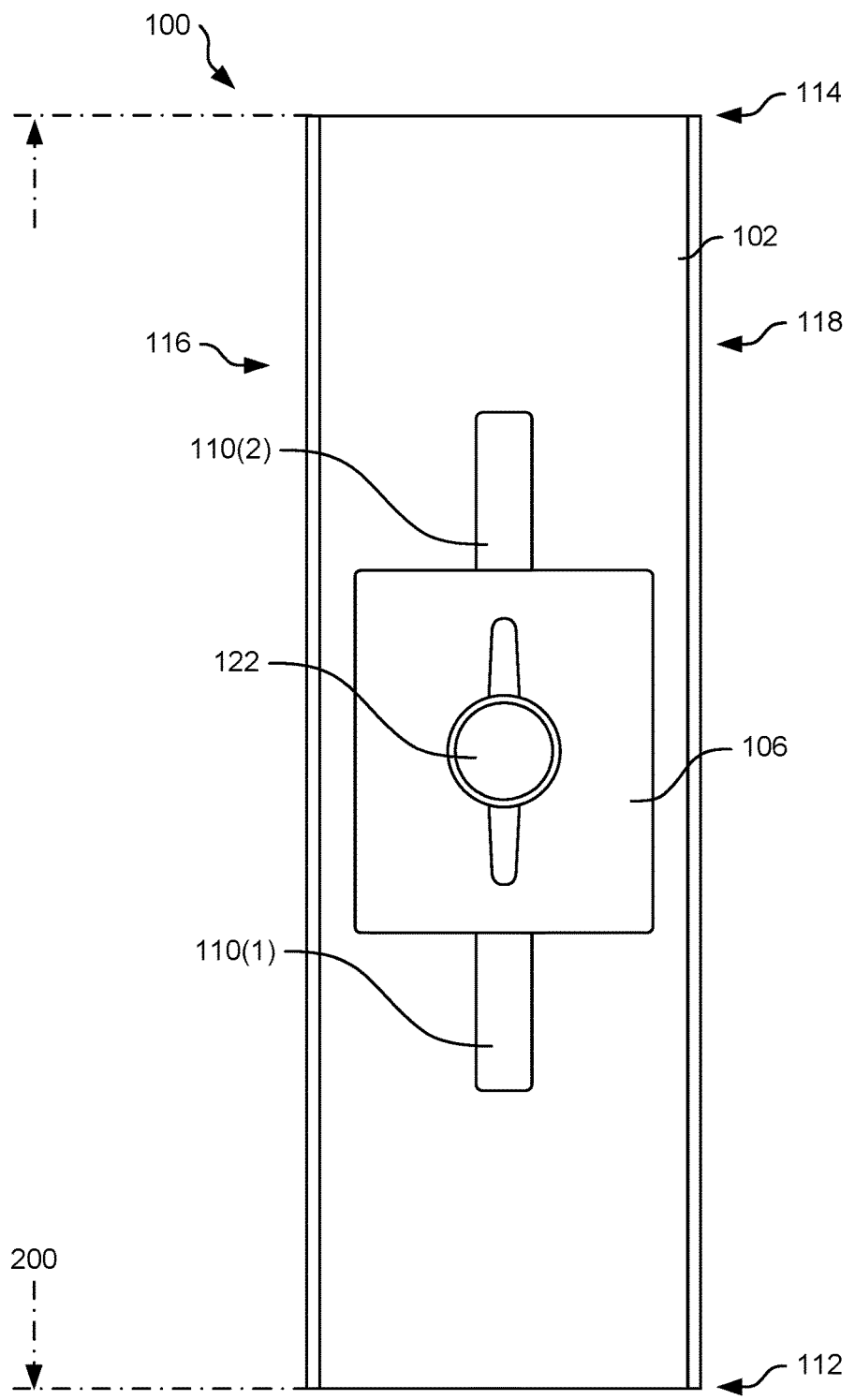
FIG. 2 illustrates a first side view of the spacing tool of FIG. 1, according to an embodiment of the present disclosure.
Figure 2:
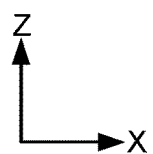

FIG. 2 illustrates a top view of the spacing tool 100, according to an embodiment of the present disclosure. The base 102 may include a length 200 that extends between the first end 112 and the second end 114. The receptacle 104 of the base 102 may extend the length 200. The first flange 110(1) and the second flange 110(2) may be centrally located on the base 102, between the first side 116 and the second side 118 (e.g., in the X-direction). The collar 106 that defines the channel 108 may be centrally located on the base 102, between the first end 112 and the second end 114 (e.g., in the Z-direction). The collar 106, the first flange 110(1), and/or the second flange 110(2) may extend from the base 102.

Figure 3:
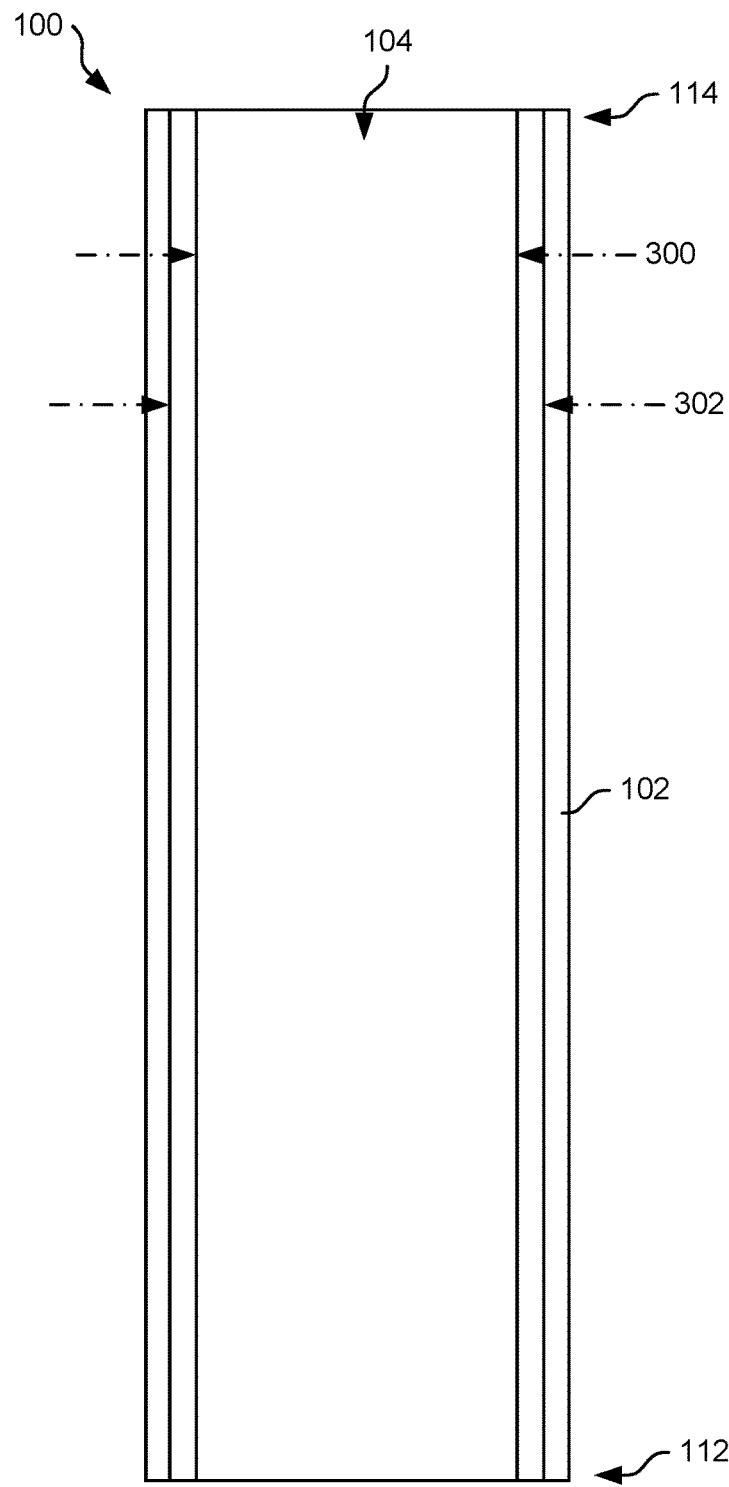
FIG. 3 illustrates a second side view of the spacing tool of FIG. 1, according to an embodiment of the present disclosure.

FIG. 3 illustrates a bottom view of the spacing tool 100, according to an embodiment of the present disclosure. As shown, the receptacle 104 may extend between the first end 112 and the second end 114, along the length 200. The receptacle 104 may also include different shapes, contours, cross-sections for engaging with a corresponding shape, contour, cross-sections, etc. of the rail. For example, the receptacle 104 may include a first width 300 and a second width 302, where the first width 300 and the second width 302 may from a contour that engages with a complimentary contour of the rail. The second width 302 may be greater than the first width 300. However, although described as having a certain contour, the receptacle 104 may not include different widths, or may include other contours than described.

Figure 4A:
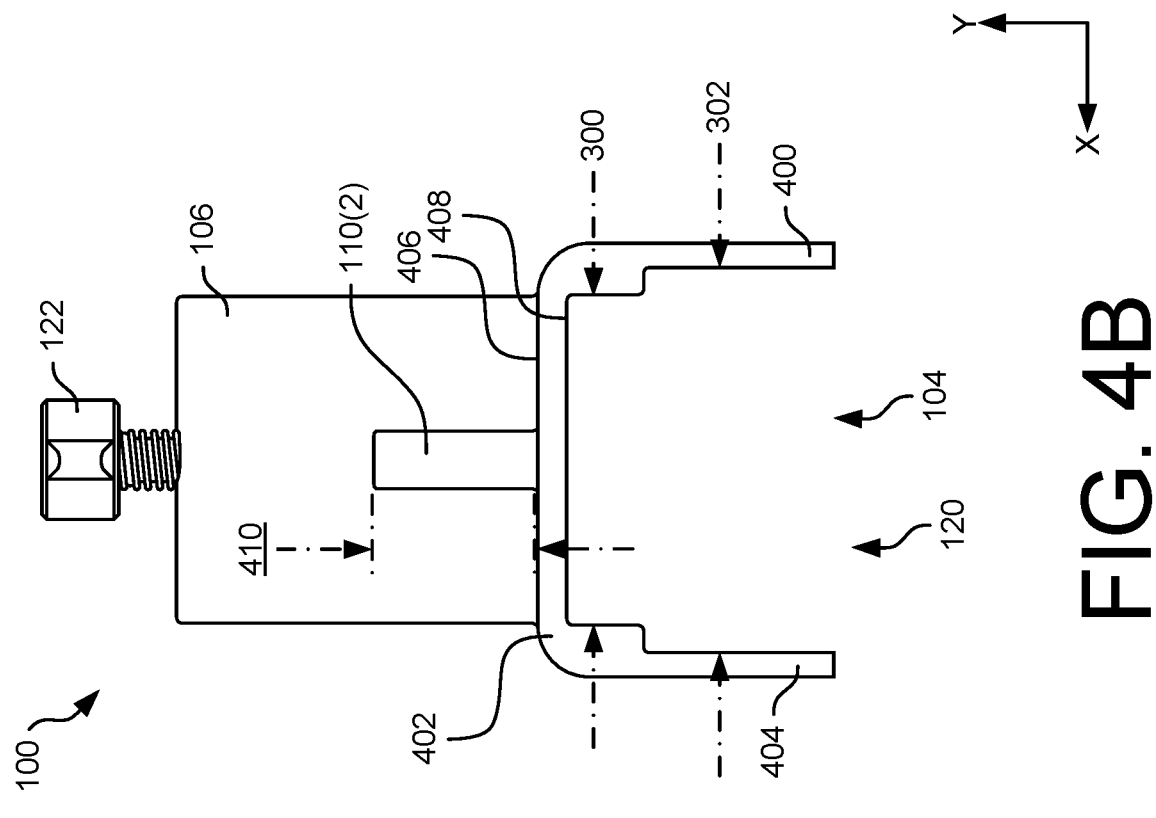
FIG. 4A illustrates a third side view of the spacing tool of FIG. 1, according to an embodiment of the present disclosure.
Figure 4B:
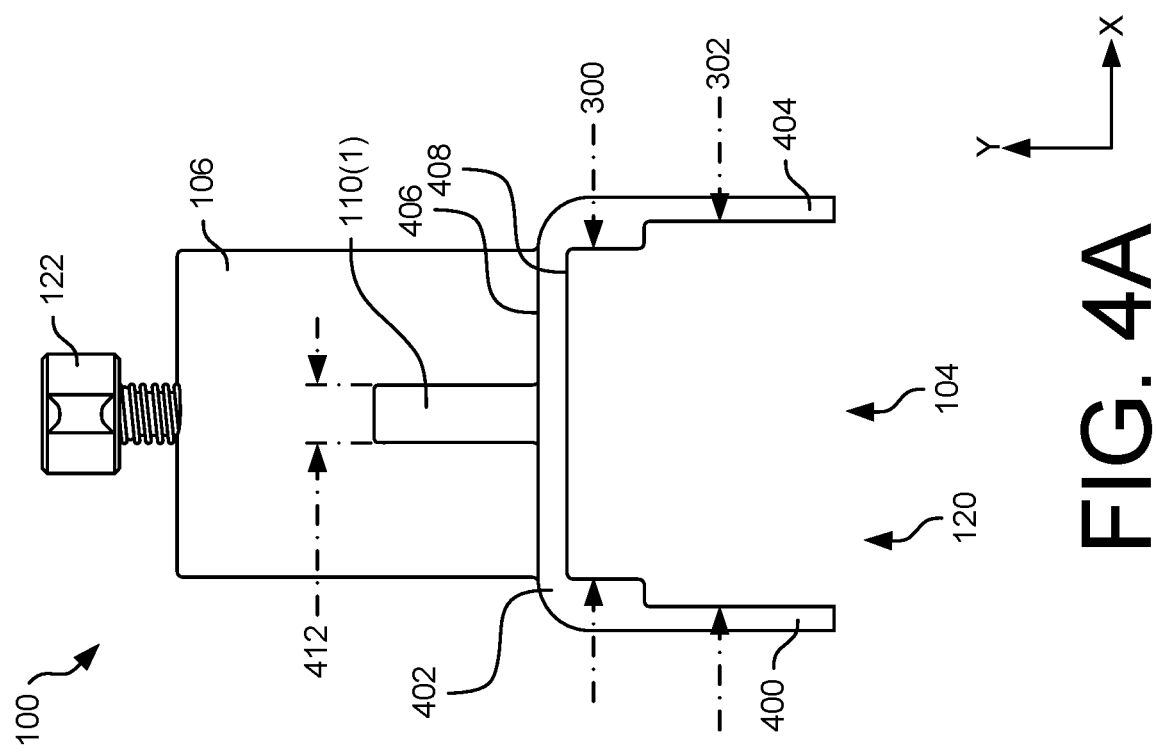
FIG. 4B illustrates a fourth side view of the spacing tool of FIG. 1, according to an embodiment of the present disclosure.

FIGS. 4A and 4B illustrate end views of the spacing tool 100, according to an embodiment of the present disclosure. FIG. 4A illustrates the first end 112, and FIG. 4B illustrates the second end 114. The base 102 may include a first sidewall 400, a second sidewall 402, and a third sidewall 404 that form the receptacle 104. For example, when coupled to the rail, the first sidewall 400, the second sidewall 402, and the third sidewall 404 may extend at least partially over/along the rail. In an embodiment, the first sidewall 400 and the third sidewall 404 may extend along opposing sides of the rail, while the second sidewall 402 may extend on top of the rail, for example. The first width 300 of the receptacle 104 is shown extending between the first sidewall 400 and the third sidewall 404, at a first location within the receptacle 104, and the second width 302 of the receptacle 104 is shown extending between the first sidewall 400 and the third sidewall 404, at a second location spaced apart from the first location. The spacing tool 100 is also open at the bottom 120 for being disposed over the rail.

The collar 106 may extend from the base 102, such as the second sidewall 402 of the base 102. For example, the collar 106 may extend or be formed on a top surface 406 of the second sidewall 402 (or a top of the base 102), opposite a bottom surface 408 disposed within the receptacle 104. The fastener 122 engages with the collar 106 at a location that is spaced apart from where the collar 106 extends from or is engaged with the base 102 (e.g., the top surface 406).

The first flange 110(1) and the second flange 110(2) may extend from the second sidewall 402. The first flange 110(1) and the second flange 110(2) may extend from the top surface 406 of the second sidewall 402. The first flange 110(1) and the second flange 110(2) may extend a height 410 (e.g., in the Y-direction) above the top surface 406. The first flange 110(1) and the second flange 110(2) may also extend a width 412 (e.g., in the X-direction) across the top surface 406. In an embodiment, during installation and/or while spacing apart the rails, the photovoltaic modules may rest on the top surface 406 of the second sidewall 402. When the first flange 110(1) and/or the second flange 110(2) are used to space adjacent photovoltaic modules, a first photovoltaic module may reside adjacent to a first side of the first flange 110(1) and a second photovoltaic module may reside adjacent to a second side of the first flange 110(1).

Figure 5A:
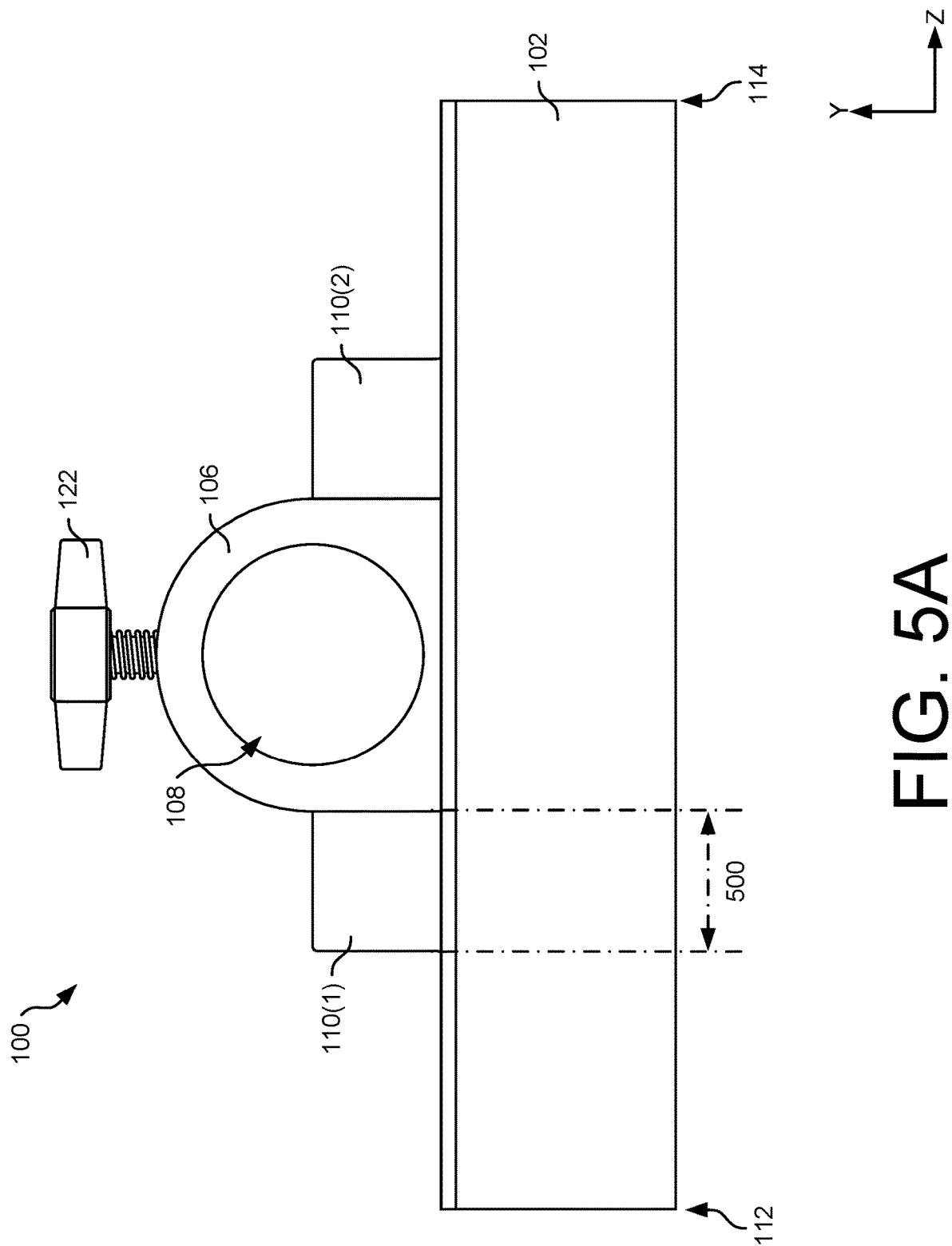
FIG. 5A illustrates a fifth side view of the spacing tool of FIG. 1, according to an embodiment of the present disclosure.
Figure 5B:
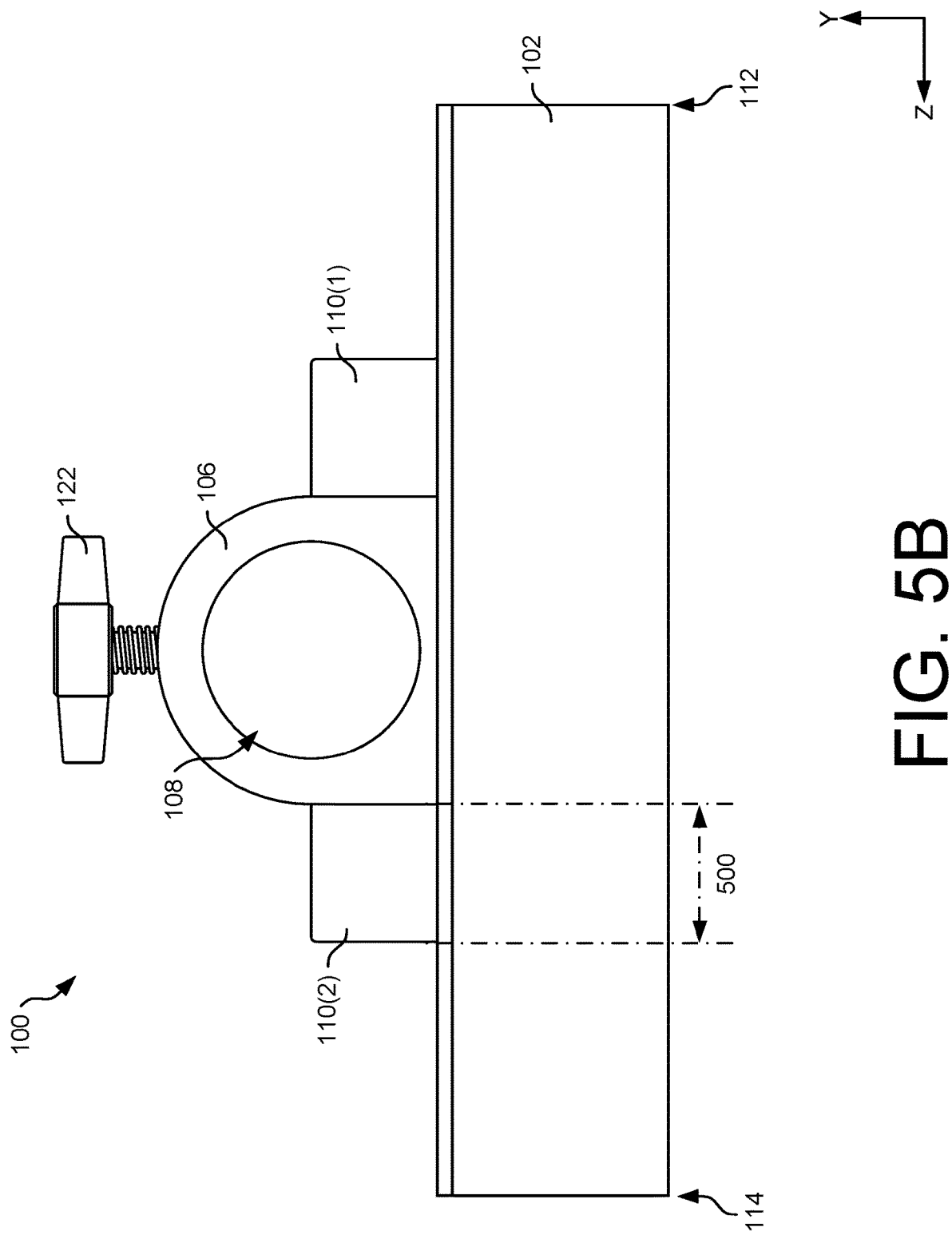
FIG. 5B illustrates a sixth side view of the spacing tool of FIG. 1, according to an embodiment of the present disclosure.

FIGS. 5A and 5B illustrate side views of the spacing tool 100, according to an embodiment of the present disclosure. The collar 106 is shown extending from the base 102, and defines the channel 108 into which the bar is received. The fastener 122 is threadingly engaged within an opening of the collar 106. An end of the fastener 122, when tightened, is configured to be disposed internal to the channel 108 for engaging with the bar in order to secure the spacing tool 100 to the bar. The channel 108 is shown being circular in shape, however, other shapes are envisioned (e.g., square, hexagonal, etc.).

The first flange 110(1) is disposed on a first side of the collar 106 and the second flange 110(2) is disposed on a second side of the collar 106. As shown, the first flange 110(1) couples to the base 102 and the collar 106 (e.g., on the first side), and the second flange 110(2) couples to the base 102 and the collar 106 (e.g., on the second side). The first flange 110(1) and the second flange 110(2) may include a length 500 (e.g., in the Z-direction). In an embodiment, the length 500 of the first flange 110(1) and/or the second flange 110(2) may be used to space adjacent photovoltaic modules end-to-end, along the length of the rails. The width 412 of the first flange 110(1) and the second flange 110(2), meanwhile, may be used space adjacent photovoltaic modules, side-by-side, between adjacent rails.

Figure 6:
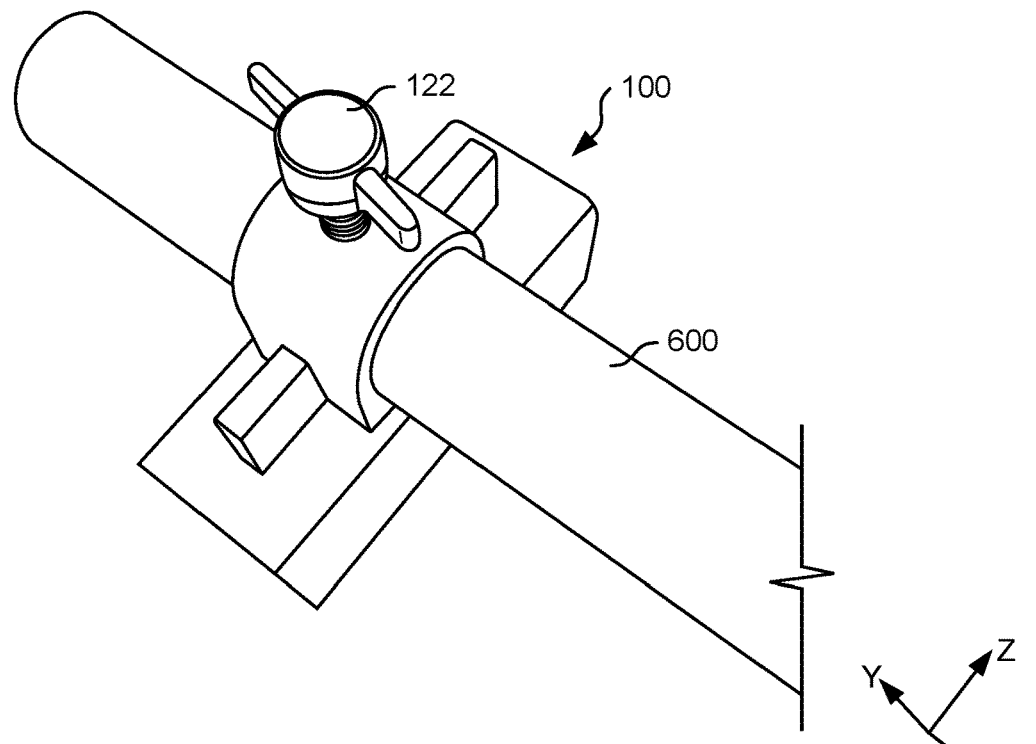
FIG. 6 illustrates a coupling of the spacing tool of FIG. 1 to an example bar, according to an embodiment of the present disclosure.

FIG. 6 illustrates a coupling of the spacing tool 100 to a bar 600, according to an embodiment of the present disclosure. As shown, the bar 600 may be received within the channel 108 of the collar 106, and the fastener 122 may be tightened to secure the bar 600 within the channel 108. Loosening the fastener 122 allows the spacing tool 100 to reposition along the bar 600 (e.g., in the X-direction), for example, via the bar 600 sliding within the channel 108. In an embodiment, the bar 600 may be ½", ¾", 1" or other dimensions in diameter. Any suitable length of the bar 600 may also be included.

Figure 7:
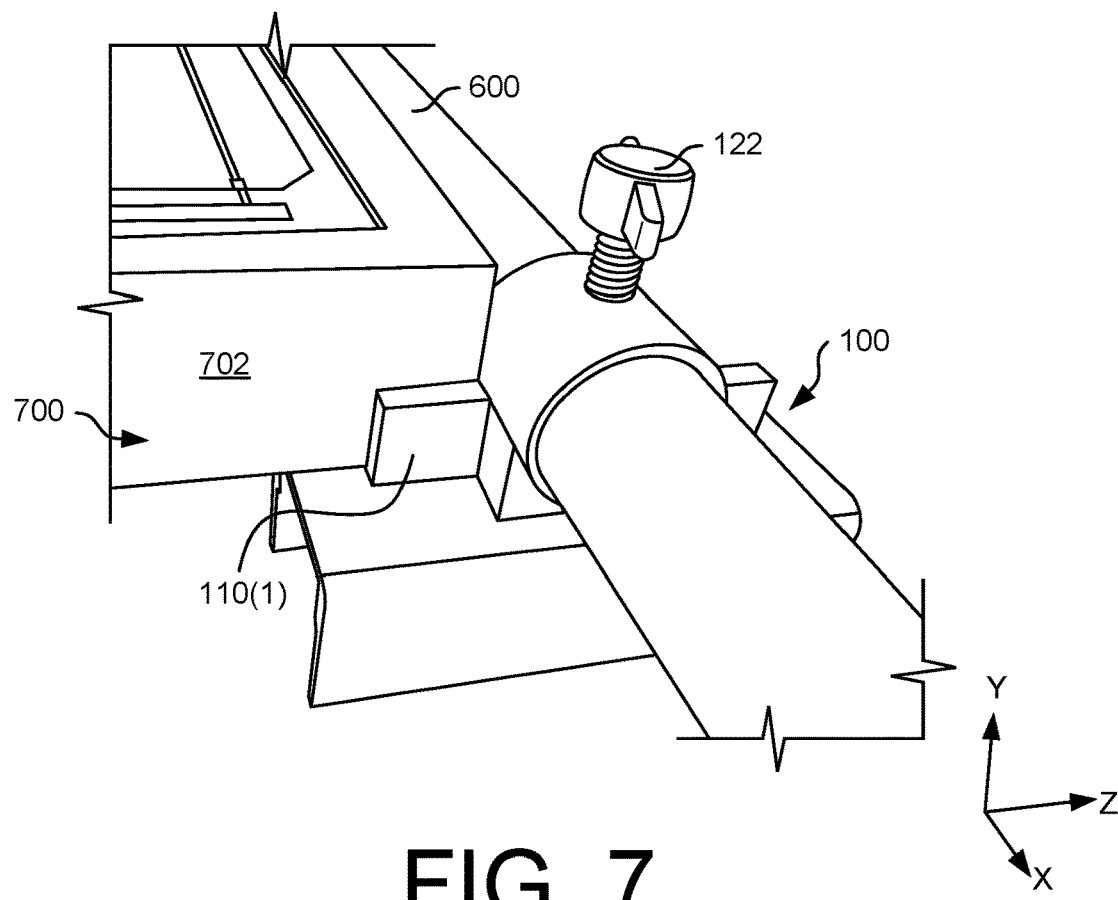
FIG. 7 illustrates an example use of the spacing tool of FIG. 1 with for spacing a photovoltaic module, according to an embodiment of the present disclosure.

FIG. 7 illustrates an use of the flanges 110 for spacing photovoltaic modules, according to an embodiment of the present disclosure. The spacing tool 100 is shown being secured to the bar 600, and the first flange 110(1), for example, may abut an edge 700 of a photovoltaic module 702. The photovoltaic module 702 may abut the first flange 110(1), on a first side of the first flange 110(1), and a second photovoltaic module may abut the first flange 110(1), on a second side of the first flange 110(1). In doing so, the photovoltaic module 702 and the second photovoltaic module may be spaced apart from one another by a desired distance.

Additionally, to set the spacing between the spacing tools 100, along the bar 600, another spacing tool 100 may be secured to the bar 600, spaced apart in the X-direction. The first flange 110(1) of the other spacing tool 100 may abut an edge of the photovoltaic module 702 opposite to the edge 700. In doing so, the spacing tools 100 may be spaced apart from one another along the bar 600 in order to accurately space the rails apart.

Figure 8:
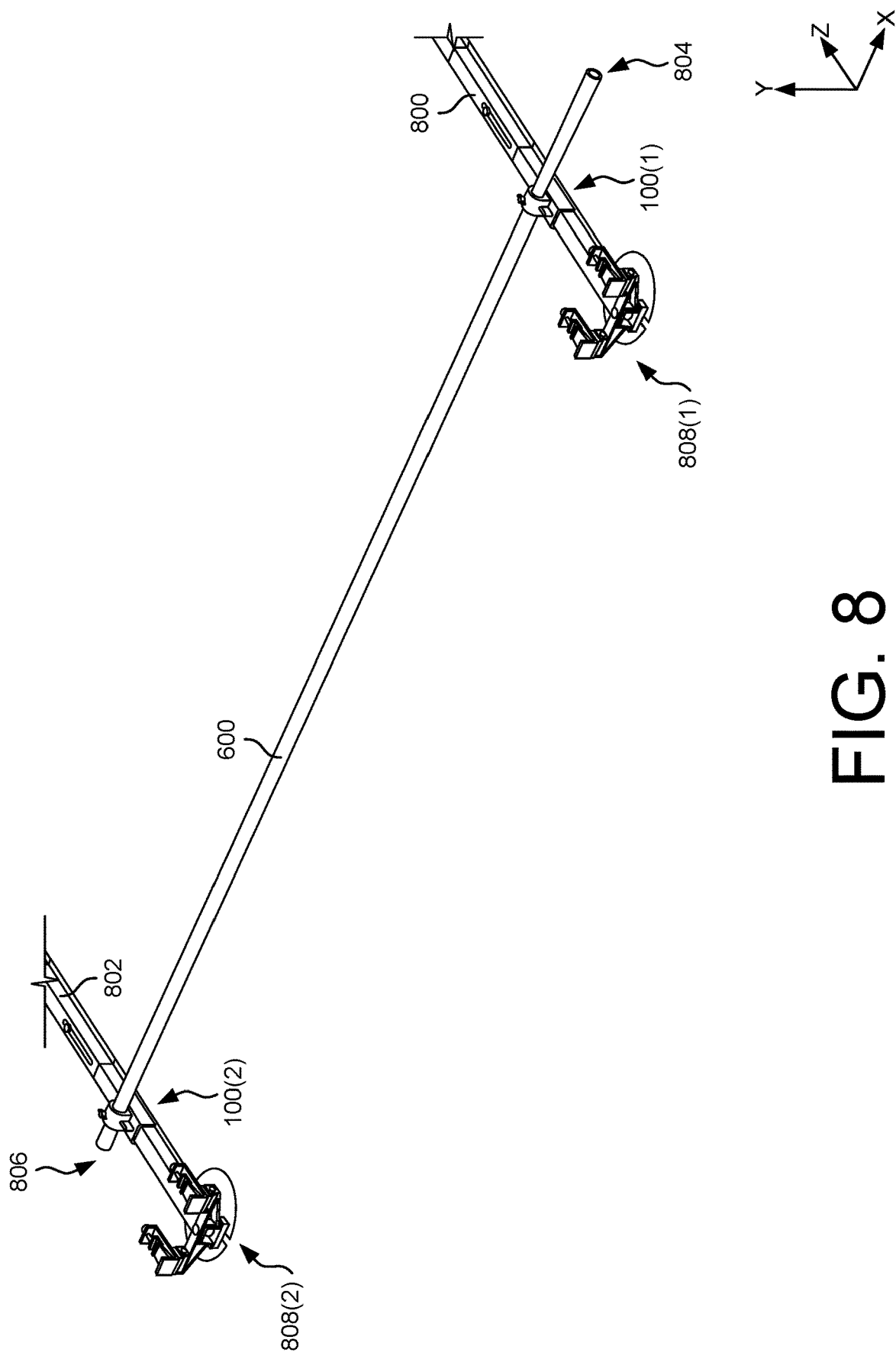
FIG. 8 illustrates an example use of spacing tools of FIG. 1 for spacing apart example rails, according to an embodiment of the present disclosure.

FIG. 8 illustrates an example use of the spacing tools 100, according to an embodiment of the present disclosure. A first spacing tool 100(1) may be disposed along a first rail 800, and a second spacing tool 100(2) may be disposed along a second rail 802. As shown, the first rail 800 and the second rail 802 may be spaced apart from one another for receiving photovoltaic modules that span a distance between the first rail 800 and the second rail 802 (e.g., in the X-direction). For example, the photovoltaic modules may secure to the first rail 800 and the second rail 802, so as to span a gap between the first rail 800 and the second rail 802.

The bar 600 is disposed within the channel 108 of the first spacing tool 100(1) and the channel 108 of the second spacing tool 100(2). During installation, the first spacing tool 100(1) may be secured to the bar 600, proximate to a first end 804 of the bar 600, using the fastener 122 of the first spacing tool 100(1). Therein, the base 102 (e.g., receptacle 104) of the first spacing tool 100(1) may be engaged (e.g., rest on, sit on, etc.) with the first rail 800. Subsequently, a second end 806 of the bar 600 may be inserted into/through the channel 108 of the second spacing tool 100(2). At a desired distance that corresponds to a spacing between the first rail 800 and the second rail 802, the fastener 122 of the second spacing tool 100(2) may be tightened to secure the second spacing tool 100(2) to the bar 600. At this point, the first spacing tool 100(1) and the second spacing tool 100(2) may be spaced apart by the desired spacing of the first rail 800 and the second rail 802. The second spacing tool 100(2) and the second rail 802 may then be manipulated into engagement. Being as the first spacing tool 100(1) is engaged with the first rail 800, as the second spacing tool 100(2) is manipulated and the second rail 802 is engaged within the receptacle of the second spacing tool 100(2), the first rail 800 and the second rail 802 may be spaced apart by the desired distance.

In an embodiment, the first rail 800 may be secured to the surface using a first mount 808(1), and/or the second rail 802 may be secured to the surface using a second mount 808(2). Additionally, the first mount 808(1) and the second mount 808(2) are shown being coupled to the first rail 800 and the second rail 802 at ends thereof. However, the first rail 800 and the second rail 802 may span a lengthwise direction (e.g., in the Z-direction). After the ends of the first rail 800 and/or the second rail 802 are coupled to surface via the first mount 808(1) and the second mount 808(2), respectively, the first spacing tool 100(1) and the second spacing tool 100(2) may be placed at another location along the first rail 800 and the second rail 802, respectively. Being as the first spacing tool 100(1) and the second spacing tool 100(2) remain coupled to the bar 600, the spacing between the first spacing tool 100(1) and the second spacing tool 100(2) remains unadjusted, and accordingly, the first rail 800 and the second rail 802 may be spaced apart at the same distance such that the first rail 800 and the second rail 802 are parallel.

In an embodiment, multiple spacing tools may be used along the lengths of the rails. For example, to space the first rail 800 and the second rail 802 along the length, the first spacing tool 100(1), the bar 600, and the second spacing tool 100(2) may be used at one end, while a third spacing tool, a second bar, and a fourth spacing tool may be used at another end. Additionally, although described as spacing two rails apart, more than two rails may be spaced apart from one another. For example, a third spacing tool may be disposed along the bar 600, between the first spacing tool 100(1) and the second spacing tool 100(2), for disposing a third rail. The third rail, for example, may support a section of the photovoltaic module that spans between the first rail 800 and the second rail 802.

Figure 9:
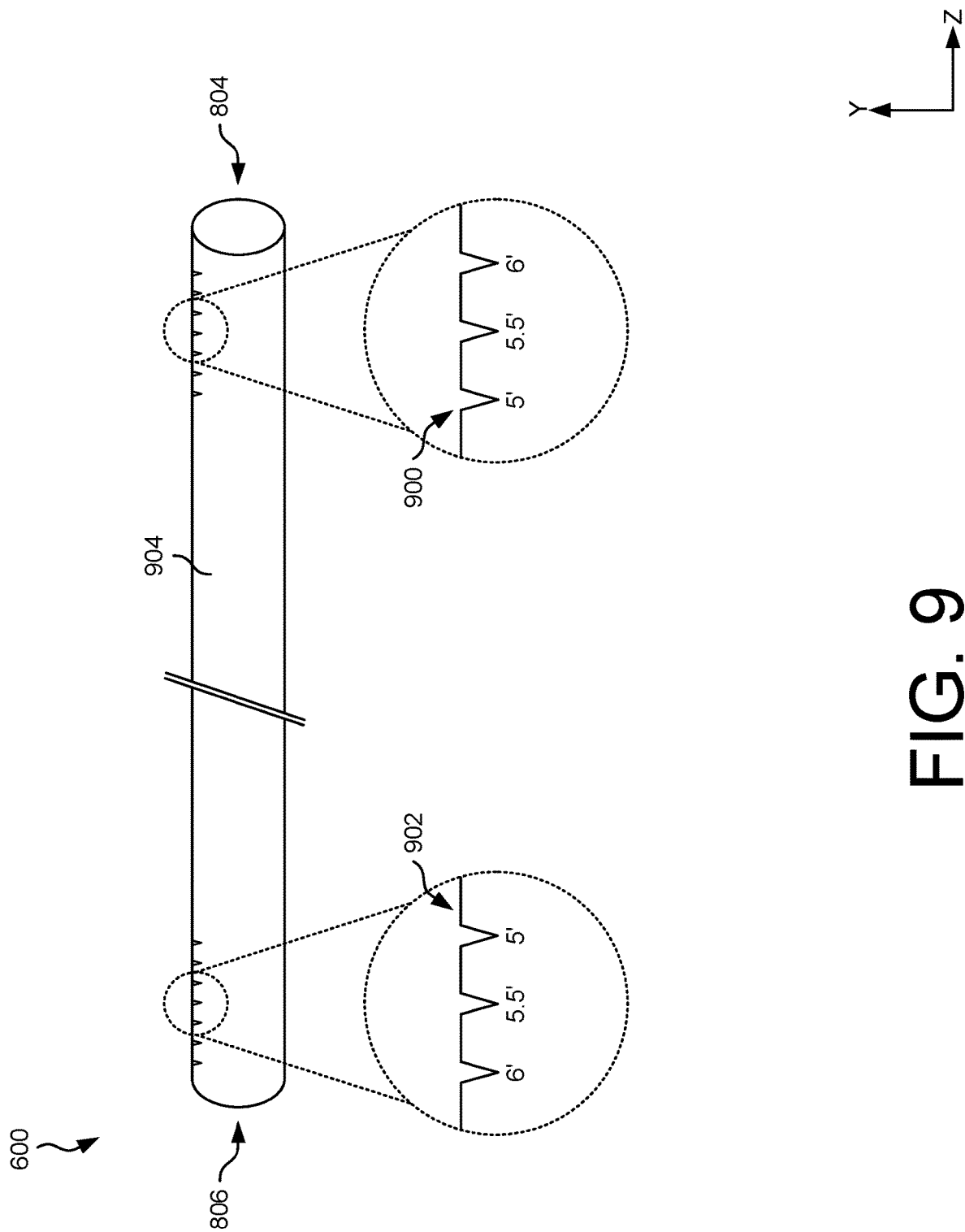
FIG. 9 illustrates an example bar used to space one or more of the spacing tools of FIG. 1 apart from one another, according to an embodiment of the present disclosure.

FIG. 9 illustrates the bar 600 used to couple one or more of the spacing tools 100 together, according to an embodiment of the present disclosure. As introduced above, the bar 600 may include the first end 804 and the second end 806, where a length of the bar 600 extends between the first end 804 and the second end 806. The bar 600 may include one or more first indicia 900 disposed proximate to the first end 804, and/or one or more second indicia 902 disposed proximate to the second end 806. The first indicia 900 and the second indicia 902 may be used to set a spacing between the first spacing tool 100(1) and the second spacing tool 100(1). For example, once the first spacing tool 100(1) is slid onto the bar 600 (via the channel 108), one of the first indicia 900 may be aligned with an edge of the collar 106 (e.g., 5.5'), or other feature of the first spacing tool 100(1). In embodiment, an edge of the collar 106 facing the second spacing tool 100(2) may be aligned with the first indicia 900 (e.g., an inside edge of the collar 106). Therein, once the second spacing tool 100(2) is slid onto the bar 600 (via the channel 108), one of the second indicia 902 may be aligned with an edge of the collar 106 (e.g., 5.5'). In an embodiment, an edge of the collar 106 facing the first spacing tool 100(1) may be aligned with the second indicia 902 (e.g., an inside edge of the collar 106). The first spacing tool 100(1) and the second spacing tool 100(2) may be aligned with corresponding indicia of the first indicia 900 and the second indicia (i.e., 5.5'), thereby spacing the first spacing tool 100(1) and the second spacing tool 100(2) apart by 5.5'.

In an embodiment, the first indicia 900 and/or the second indicia 902 may represent notches formed within an exterior surface 904 of the bar 600. However, the first indicia 900 and/or the second indicia 902 may represent other indications, markings, etc. on the bar 600. The first indicia 900 and/or the second indicia 902 may also include other spacing or dimensions than shown.

Figure 10:
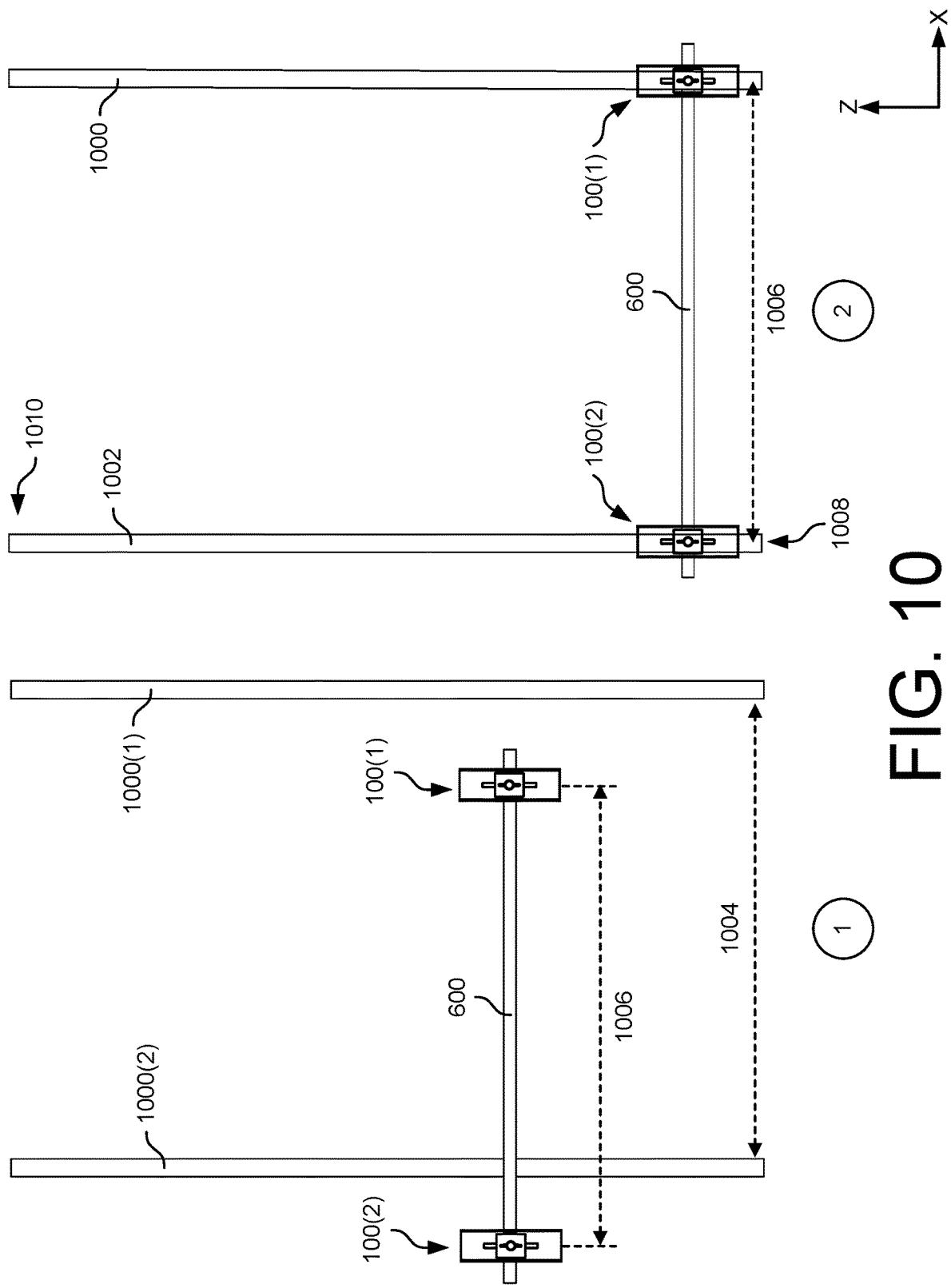
FIGS. 10 and 11 illustrate an example use of the spacing tool of FIG. 1, showing a progression of steps for spacing apart rails that receive photovoltaic modules, according to an embodiment of the present disclosure.
Figure 11:
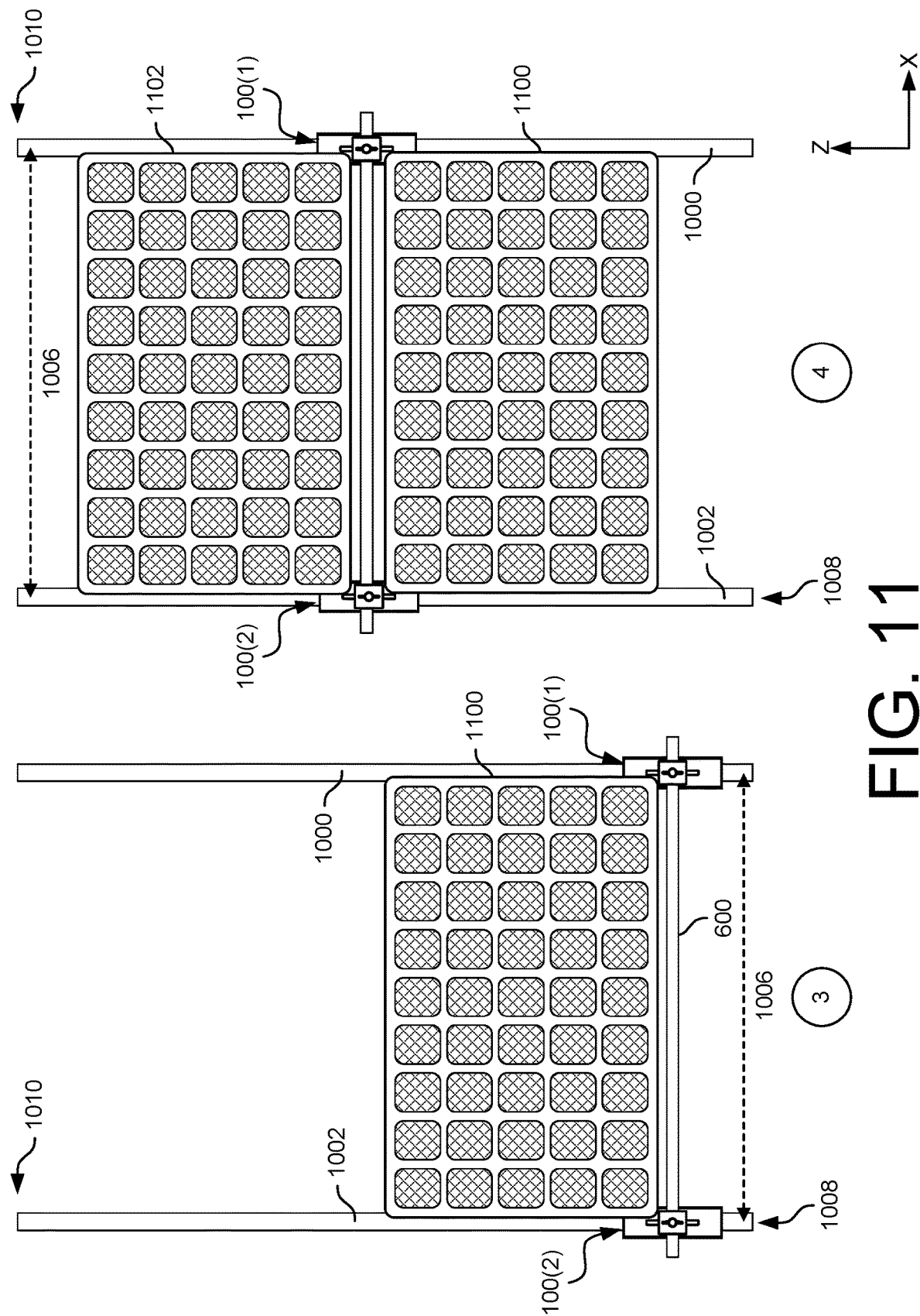

FIGS. 10 and 11 illustrate an example use of one or more of the spacing tools 100, according to an embodiment of the present disclosure. As shown in FIG. 10, initially, at "1" a first rail 1000 and a second rail 1002 may be spaced apart by a first distance 1004. The first distance 1004 may be less than or greater than a second distance 1006 by which the first rail 1000 and the second rail 1002 are to be spaced apart for receiving photovoltaic modules. For example, a first spacing tool 100(1) and a second spacing tool 100(2) may be spaced apart by the second distance 1006, which corresponds to a width of the photovoltaic modules, and which is set by aligning the flanges 110 adjacent to edges of the photovoltaic modules. In an embodiment, the second distance 1006 may span between a center of the first spacing tool 100(1) and a center of the second spacing tool 100(2). Moreover, the first spacing tool 100(1) and the second spacing tool 100(2) may be coupled to the bar 600 before or after being disposed on the first rail 1000 and the second rail 1002, respectively.

At "2" in FIG. 10, the first spacing tool 100(1) and the second spacing tool 100(2) may be placed on the first rail 1000 and the second rail 1002, respectively. In doing so, the first rail 1000 and the second rail 1002 may be spaced apart from one another by an appropriate distance. In some instances, after the first rail 1000 and the second rail 1002 are spaced apart from one another at a first end 1008 of the first rail 1000 and the second rail 1002, the first end 1008 of the first rail 1000 and the second rail 1002 may be secured in place. Alternatively, in some instances, after the first rail 1000 and the second rail 1002 are spaced apart from one another at the first end 1008 of the first rail 1000 and the second rail 1002, the first spacing tool 100(1), the second spacing tool 100(2) and the bar 600 may be moved to a second end 1010 spaced apart from the first end 1008 (e.g., in the Z-direction), for evenly spacing the first rail 1000 and the second rail 1002 along their length (e.g., in the Z-direction).

In FIG. 11, at "3" a first photovoltaic module 1100 may be coupled to the first rail 1000 and the second rail 1002. As such, with the spacing between the first rail 1000 and the second rail 1002 being set at the second distance 1006, the first photovoltaic module 1100 may be secured to the first rail 1000 and the second rail 1002. In an embodiment, the first photovoltaic module 1100 may be secured to the first rail 1000 and the second rail 1002 directly (e.g., via fasteners) or indirectly (e.g., via the use of brackets, mounts, etc.).

At "4" in FIG. 11, a second photovoltaic module 1102 may be secured to the first rail 1000 and the second rail 1002. As also shown, the first spacing tool 100(1), the second spacing tool 100(2) and the bar 600 may be moved to another location along the first rail 1000 and the second rail 1002(2) for spacing the first rail 1000 and the second rail 1002 apart by the second distance 1006. Therein, the second photovoltaic module 1102 may be secured to the first rail 1000 and the second rail 1002.

In some instances, the collar 106 of the first spacing tool 100(1) and the second spacing tool 100(2) may be used to evenly space the first photovoltaic module 1100 and the second photovoltaic module 1102 apart from one another (e.g., in the Z-direction). For example, a first side of the first photovoltaic module 1100 may abut a first edge of the collar 106 of the first spacing tool 100(1) and the second spacing tool 100(2), respectively, while a second side of the second photovoltaic module 1102 may abut a second edge of the collar 106 of the first spacing tool 100(1) and the second spacing tool 100(2). In an embodiment, after the second photovoltaic module 1102 is secured to the first rail 1000 and the second rail 1002, the first spacing tool 100(1), the second spacing tool 100(2) and the bar 600 may be removed.

Figure 12:
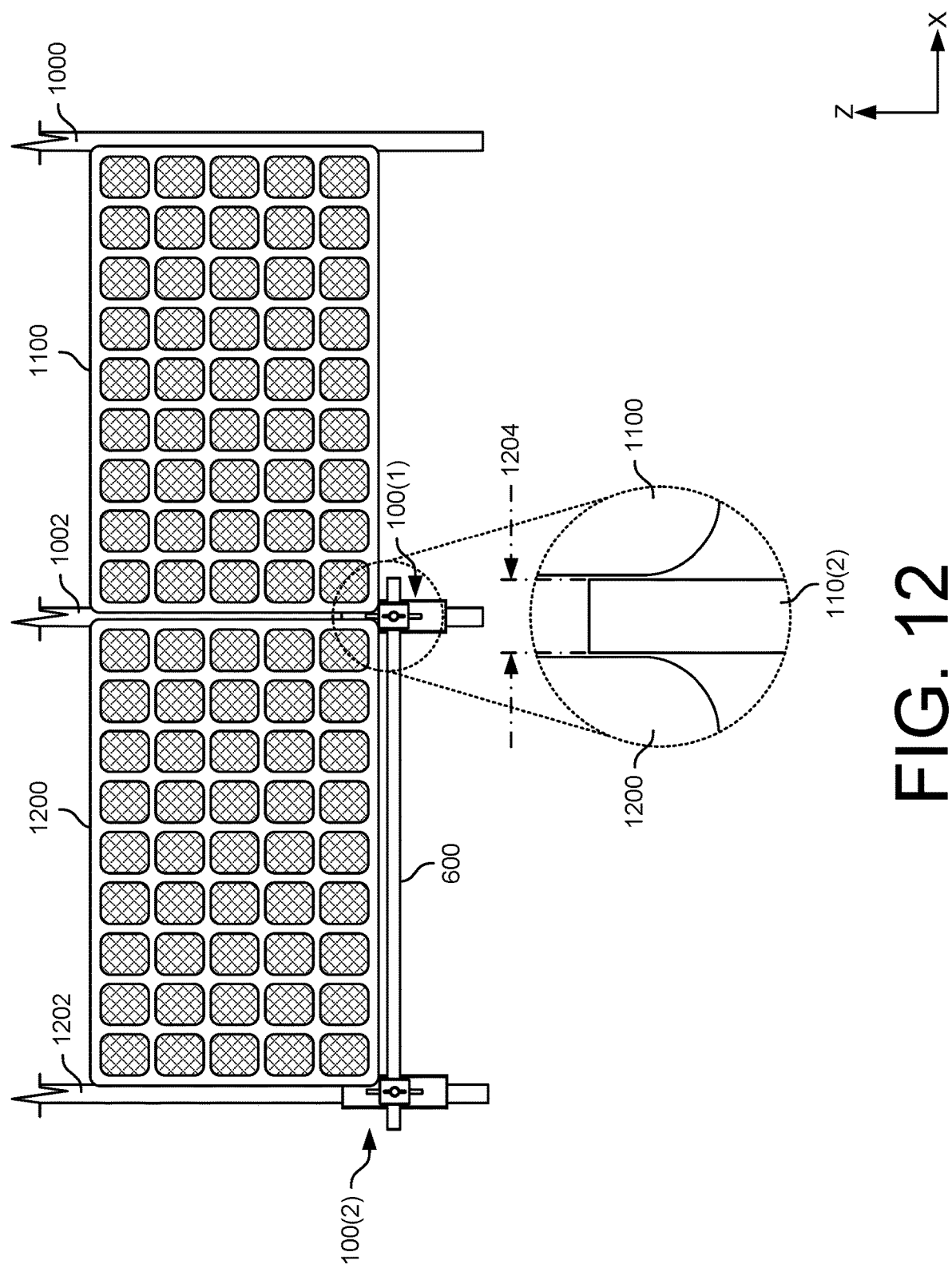
FIGS. 12 and 13 illustrate an example use of the spacing tool of FIG. 1, according to an embodiment of the present disclosure.
Figure 13:
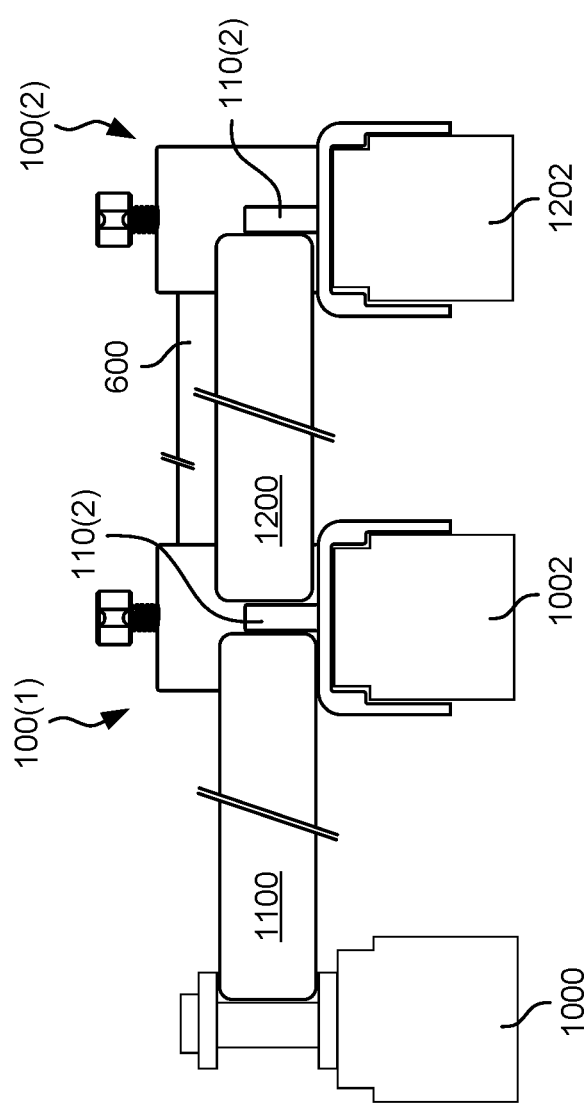

FIGS. 12 and 13 illustrate an use of the spacing tools 100 for spacing adjacent rails, according to an embodiment of the present disclosure. After installing the first photovoltaic module 1100 to the first rail 1000 and the second rail 1002, and/or the second photovoltaic module 1102 to the first rail 1000 and the second rail 1002, a third photovoltaic module 1200 may be installed on a third rail 1202 and the second rail 1002. As shown, the third rail 1202 may be disposed adjacent to the second rail 1002, and the first spacing tool 100(1) and the second spacing tool 100(2) may be used to space apart the second rail 1002 and the third rail 1202 by the desired distance (e.g., same or different than the second distance 1006). Additionally, the first spacing tool 100(1), or more particularly the second flange 110(2) may be used to space the first photovoltaic module 1100 and the third photovoltaic module 1200 apart from one another. For example, the first flange 110(1) may space the first photovoltaic module 1100 and the third photovoltaic module 1200 apart by a distance 1204. The first spacing tool 100(1) and the second spacing tool 100(2) may be moved to another end of the first photovoltaic module 1100 and the third photovoltaic module 1200 (e.g., in the Z-direction) to properly space the first photovoltaic module 1100 and the third photovoltaic module 1200 apart (whether using the first spacing tool 100(1) and the second spacing tool 100(2), or other spacing tools). The first spacing tool 100(1) and the second spacing tool 100(2).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a bar including a first end and a second end;
   a first spacing tool including:
      a first base defining a first receptacle configured to receive a first rail,
      a first flange,
      a second flange,
      a first collar defining a first channel configured to receive a first portion of the bar proximate to the first end, the first collar disposed between the first flange and the second flange, and
      a first fastener configured to secure the first portion of the bar within the first channel; and
   a second spacing tool including:
      a second base defining a second receptacle configured to receive a second rail,
      a third flange,
      a fourth flange, a second collar defining a second channel configured to receive a second portion of the bar proximate to the second end, the second collar disposed between the third flange and the fourth flange, and a second fastener configured to secure the second portion of the bar within the second channel.

2. The system of claim 1, wherein:

the first fastener threadingly engages with the first collar; and the second fastener threadingly engages with the second collar.

3. The system of claim 1, wherein:

the first base has:
  a first side,
  a second side, and
  a first dimension that extends in a direction between the first side and the second side;

the second base has:
  a third side,
  a fourth side, and
  a second dimension that extends in a direction between the third side and the fourth side;

the first flange includes a third dimension that is less than the first dimension; and the second flange includes in a fourth dimension that is less than the second dimension.

4. The system of claim 1, wherein:

the first receptacle is oriented perpendicularly to the first channel; and the second receptacle is oriented perpendicularly to the second channel.

5. The system of claim 1, wherein the bar further includes one or more indicia associated with a spacing between rails that are configured to receive photovoltaic modules.

6. A system comprising:

a bar;

a first spacing tool including:
  a first base,
  a first flange,
  a second flange,
  a first receptacle configured to receive at least a portion of a first rail that supports a photovoltaic module, and
  a first collar defining a first channel disposed between the first flange and the second flange, the first channel being configured to receive a first portion of the bar; and a second spacing tool including:
  a second base,
  a third flange,
  a fourth flange,
  a second receptacle configured to receive at least a portion of a second rail that supports the photovoltaic module, and
  a second collar defining a second channel disposed between the third flange and the fourth flange, the second channel being configured to receive a second portion of the bar.

7. The system of claim 6, wherein:

the first base includes a first end and a second end;

the first channel is centrally located between the first end and the second end;

the second base includes a third end and a fourth end; and the second channel is centrally located between the third end and the fourth end.

8. The system of claim 6, wherein:

the first flange, the second flange, and the first collar extend from a first surface of the first base; and the third flange, the fourth flange, and the second collar extend from a second surface of the second base.

9. The system of claim 8, wherein:

the first base further includes a third surface that is opposite the first surface, the first surface at least partially defining the first receptacle; and the second base further includes a fourth surface that is opposite the second surface, the second surface at least partially defining the second receptacle.

10. The system of claim 6, wherein the bar further includes one or more indicia associated with a spacing between rails that are configured to receive photovoltaic modules.

11. The system of claim 6, wherein:

the first flange and the second flange include a first thickness associated with a first spacing between first adjacent photovoltaic modules; and the third flange and the fourth flange include a second thickness associated with a second spacing between second adjacent photovoltaic modules.

12. The system of claim 6, wherein:

the first base includes one or more first sidewalls that define the first receptacle; and the second base includes one or more second sidewalls that define the second receptacle.

13. The system of claim 6, further comprising:

a first fastener threadingly engaged with the first collar; and a second fastener threadingly engaged with the second collar.

14. The system of claim 6, wherein:

the first channel is oriented perpendicular to the first receptacle; and the second channel is oriented perpendicular to the second receptacle.

* * * * *